United States Patent
Hiti et al.

(10) Patent No.: US 7,755,319 B2
(45) Date of Patent: Jul. 13, 2010

(54) APPARATUS, SYSTEMS, AND METHODS FOR REDUCING VOLTAGE SOURCE INVERTER LOSSES

(75) Inventors: Silva Hiti, Redondo Beach, CA (US); Steven E. Schulz, Torrance, CA (US); Brian A Welchko, Torrance, CA (US)

(73) Assignee: GM Global Technology Operations, Inc., Detroit, MI (US)

(*) Notice: Subject to any disclaimer, the term of this patent is extended or adjusted under 35 U.S.C. 154(b) by 358 days.

(21) Appl. No.: 11/756,421

(22) Filed: May 31, 2007

(65) Prior Publication Data

US 2008/0297100 A1 Dec. 4, 2008

(51) Int. Cl.
*H02P 27/04* (2006.01)

(52) U.S. Cl. .................. 318/801; 318/807; 318/808

(58) Field of Classification Search .......... 318/801, 318/807, 808, 400.17, 400.34, 400.3; 363/98, 363/41

See application file for complete search history.

(56) References Cited

U.S. PATENT DOCUMENTS

2004/0217729 A1* 11/2004 Recker .................. 318/807
2005/0024902 A1* 2/2005 Hiti et al. ................ 363/37
2009/0295316 A1* 12/2009 Patel et al. ............ 318/400.02

* cited by examiner

*Primary Examiner*—Karen Masih
(74) *Attorney, Agent, or Firm*—Ingrassia Fisher & Lorenz, P.C.

(57) ABSTRACT

Apparatus, systems, and methods are provided for reducing voltage source inverter losses. One apparatus includes a sensor couplable to the motor and configured to sense an operating frequency of the motor and an amount of torque produced by the motor. The apparatus also includes a controller coupled to the sensor, the controller configured to determine a zero vector modulation (ZVM) based on the sensed frequency and torque. A system includes means for sensing a threshold output frequency of the motor and means for sensing a threshold torque of the motor. The system also includes means for determining a ZVM for the inverter based on the sensed threshold frequency and threshold torque. One method includes sensing that a motor is operating below a threshold frequency and is producing torque above a threshold torque amount. The method also includes determining a ZVM for the inverter based on the sensed frequency and torque.

20 Claims, 6 Drawing Sheets

APPARATUS, SYSTEMS, AND METHODS FOR REDUCING VOLTAGE SOURCE INVERTER LOSSES

TECHNICAL FIELD

The present invention generally relates to voltage source inverters, and more particularly relates to managing the thermal properties and current distortion of power switches in voltage source inverters when supplying voltage to an electric motor producing a large amount of torque at low output frequencies.

BACKGROUND OF THE INVENTION

Many applications (e.g., motor drive systems for electric or hybrid motor vehicles) utilize a voltage source inverter (VSI). Typically, the VSI supplies voltage to a multi-phase electric motor (e.g., an alternating current (AC) motor), which in turn, drives the wheels of the electric or hybrid motor vehicle.

Thermal management issues concerning power switches within the VSI arise when the VSI supplies voltage to the electric motor when the electric motor is producing large amounts of torque at low output frequencies (including zero output frequency). That is, the VSI is applying a low (or zero) voltage across the motor phases while receiving a constant input voltage (i.e., a direct current (DC) voltage). When operating at low output frequencies, the average voltage supplied by the VSI is small compared to the input voltage; however, the current the VSI supplies may be at the switch-rated current for the VSI.

These thermal management issues typically arise when the electric motor is producing large amounts of torque at low or zero output frequencies because of slowly changing AC currents in the VSI. That is, a power switch in the VSI may be required to continuously carry the peak phase current or at least carry the peak phase current for an extended period of time, which causes constant high power dissipation inside the power switch and represents a worst-case operating condition for a VSI switch.

A conventional solution for this situation is to time-limit the VSI operation at zero output frequency and full output current. Unfortunately, this solution is problematic for some applications (e.g., electric and hybrid motor vehicles) because it limits the time during which large amounts of torque may be applied by the electric motor (e.g., during vehicle start).

Accordingly, it is desirable to apparatus, systems, and methods for reducing inverter losses when the electric motor is producing large amounts of torque at low output frequencies (including a zero output frequency). Furthermore, other desirable features and characteristics of the present invention will become apparent from the subsequent detailed description and the appended claims, taken in conjunction with the accompanying drawings and the foregoing technical field and background.

SUMMARY OF THE INVENTION

Apparatus are provided for reducing losses in an inverter coupled to a motor. One apparatus comprises a sensor couplable to the motor and configured to sense an operating frequency and an amount of torque produced by the motor. The apparatus also comprises a controller coupled to the sensor and configured to determine a zero vector modulation (ZVM) based on the sensed frequency and torque.

Various embodiments of the invention also provide a system for reducing losses in an inverter coupled to a motor. A system comprises means for sensing a threshold output frequency of the motor and means for sensing a threshold torque of the motor. The system also comprises means for determining a ZVM for the inverter based on the sensed threshold output frequency and the threshold torque.

Methods for reducing losses in an inverter coupled to a motor are also provided. One method comprises the steps of sensing that the motor is operating below a threshold frequency and sensing that the motor is producing torque above a threshold torque amount. The method also comprises the step of determining a ZVM for the inverter based on the sensed frequency and torque.

DESCRIPTION OF THE DRAWINGS

The present invention will hereinafter be described in conjunction with the following drawing figures, wherein like numerals denote like elements.

DESCRIPTION OF EXEMPLARY EMBODIMENTS

The following detailed description is merely exemplary in nature and is not intended to limit the invention or the application and uses of the invention. Furthermore, there is no intention to be bound by any expressed or implied theory presented in the preceding technical field, background, summary, or the following description of exemplary embodiments.

Figure 1:
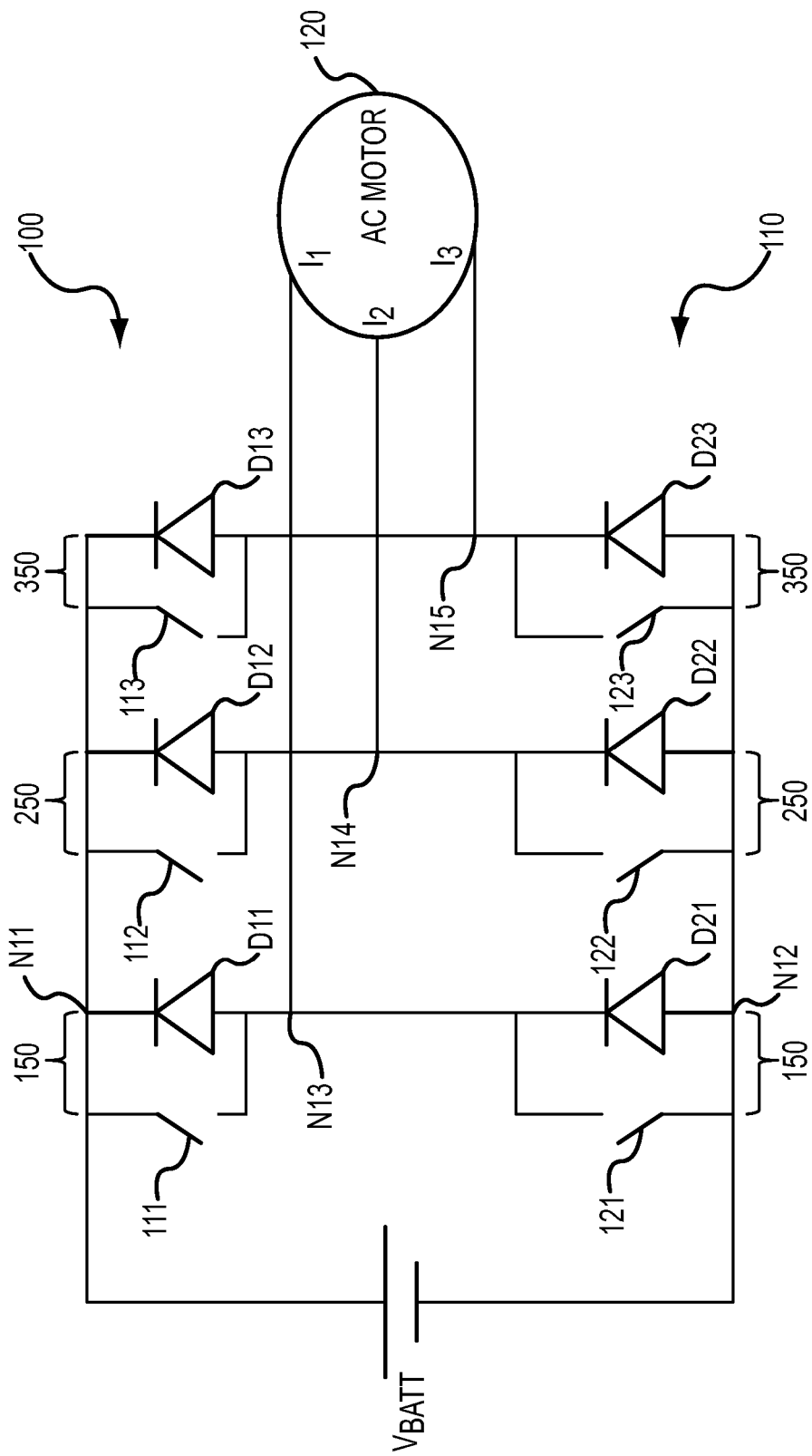
FIG. 1 is a schematic diagram of a conventional motor drive system.

FIG. 1 is a schematic diagram illustrating a conventional motor drive system 100 including a voltage source inverter (VSI) 110 and an alternating current (AC) motor 120. VSI 110 includes a power supply ($V_{batt}$), a plurality of diodes (e.g., diodes $D_{11}$-$D_{23}$), and a plurality of switches (e.g., switches 111-123). FIG. 1 also shows VSI 110 as having a plurality of nodes (e.g., nodes $N_{11}$-$N_{15}$) for illustrative purposes.

As illustrated in FIG. 1, $V_{batt}$ includes a positive terminal (+) coupled to node $N_{11}$, and a negative terminal (−) coupled to node $N_{12}$. The cathode of diode $D_{11}$ is coupled to node $N_{11}$, and the anode is coupled to node $N_{13}$. The cathode of diode $D_{12}$ is coupled to node $N_{11}$, and the anode is coupled to node $N_{14}$. The cathode of diode $D_{13}$ is coupled to node $N_{11}$, and the anode is coupled to node $N_{15}$. Similarly, the cathode of diode $D_{21}$ is coupled to node $N_{13}$, and the anode is coupled to node $N_{12}$. The cathode of diode $D_{22}$ is coupled to node $N_{14}$, and the anode is coupled to node $N_{12}$. The cathode of diode $D_{23}$ is coupled to node $N_{15}$, and the anode is coupled to node $N_{12}$.

Diodes $D_{11}$-$D_{23}$ are each coupled in parallel with a respective one of switches 111-123. This combination of a diode coupled in parallel with a switch is known as a "power switch" configuration. Each power switch is capable of conducting current in two directions, and is also capable of stopping voltage in one direction. Two series-coupled power switches form what is generally known as an "inverter branch." As FIG. 1 illustrates, VSI 110 comprises three inverter branches (e.g., inverter branches 150, 250, and 350).

Switches 111-123 control the flow of current within a portion of each respective branch of VSI 110. In one embodiment (see FIG. 2), switches 111-123 are software controlled switches utilizing high frequency pulse width modulation (PWM) techniques. As used herein, reference to an "upper switch" refers to one or more of switches 111-113, and reference to a "lower switch" refers to one or more of switches 121-123.

AC motor 120 includes three terminals (e.g., terminals $I_1$-$I_3$) coupled to VSI 110. Terminal $I_1$ is coupled to node $N_{13}$, terminal $I_2$ is coupled to node $N_{14}$, and terminal $I_3$ is coupled to node $N_{15}$. AC motor 120 is energized with a voltage supplied from VSI 110 and produces a mechanical output based on the supplied voltage.

VSI 110 includes six current bi-directional, voltage uni-directional power switches (e.g., switches 111, 112, 113, 121, 122, and 123). During operation, one switch in each inverter branch is open and the other switch is closed. In this configuration, closing a switch allows current to flow within a portion of the inverter branch, whereas opening the switch prevents current from flowing within that portion.

For example (see FIG. 1), closing switch 111 allows current to flow from power supply $V_{batt}$ to terminal $I_1$ via node $N_{13}$. Alternatively, closing switch 111 may also allow current to flow in the opposite direction from terminal $I_1$ to supply $V_{batt}$ (via node $N_{13}$), depending on the operating conditions of AC motor 120.

A high frequency PWM technique is utilized to control the output voltage magnitude, phase angle, and the frequency. That is, while the power switches are controlled to operate at a substantially constant switching frequency ($f_{sw}$), the switch duty cycles are modulated to produce three-phase voltages of desired magnitude, phase, and frequency.

Figure 2:
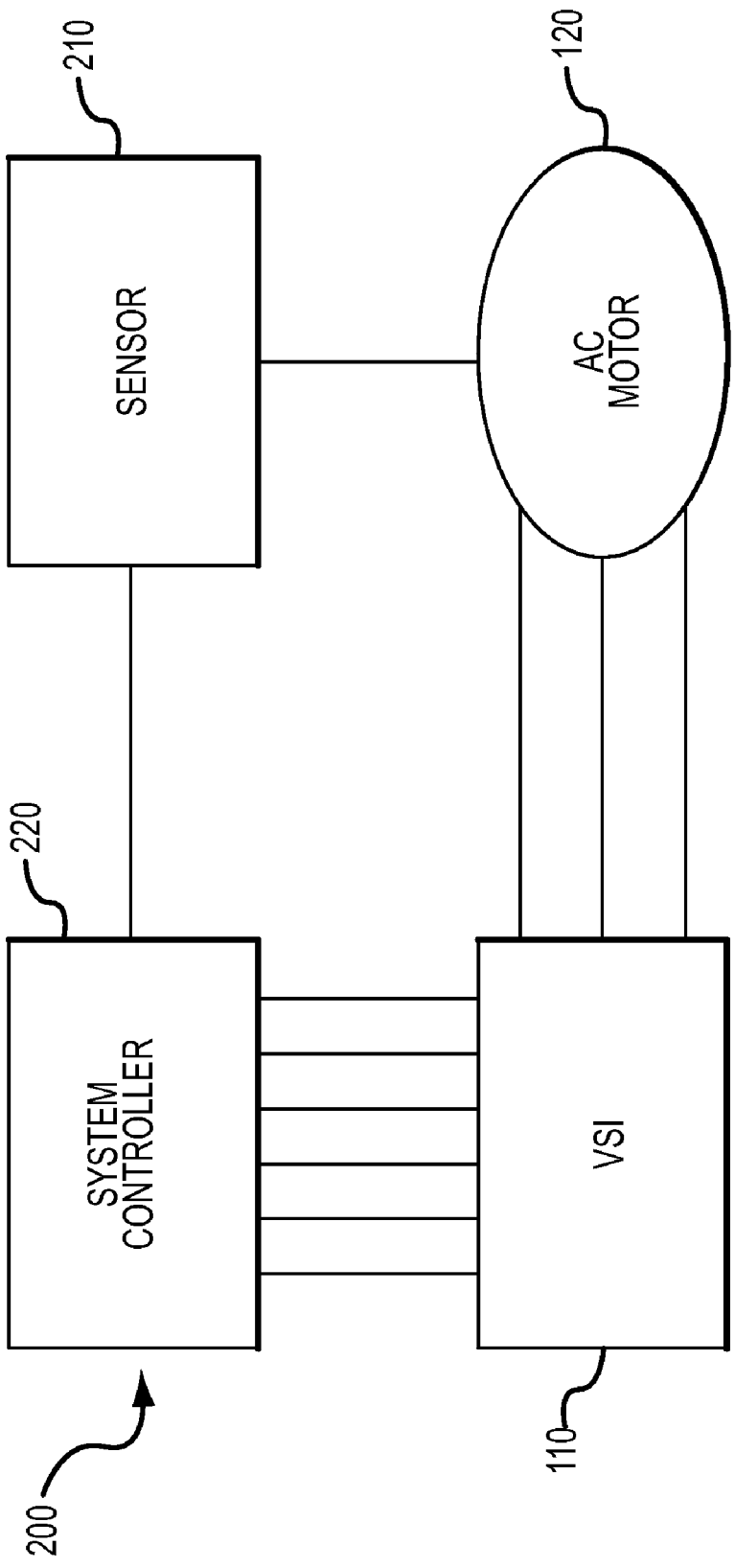
FIG. 2 is a schematic diagram of one exemplary embodiment of a system controller for managing the thermal properties and current distortion of the power switches in the voltage source inverter and AC motor of FIG. 1.

FIG. 2 is a schematic diagram of one exemplary embodiment of a system controller 200 for managing the thermal properties and current distortion of the power switches in VSI 110 when AC motor 120 is producing large amounts of torque at low speeds. System 200 includes one or more sensors 210 coupled to AC motor 120. The sensors employed may be either, or a combination of, physical hardware sensors or their virtual software or mathematical equivalents.

The one or more sensors 210 are configured to sense the torque AC motor 120 is producing (or a current-mapped representation of the torque) and the rotational frequency of AC motor 120. The torque AC motor 120 is producing and the rotational frequency at which it is operating is transmitted from sensor(s) 210 to system controller 220.

System controller 220, in addition to being coupled to sensors 210, is coupled to VSI 110. System controller 220 is configured to receive the sensed torque and rotational frequency data of AC motor 120 and to selectively apply a zero vector modulation (discussed below) to VSI 110. More specifically, if AC motor 120 is producing torque greater than a threshold amount of torque and is operating at a rotational frequency below a threshold rotational frequency, then system controller 220 applies the zero vector modulation.

Figure 3:
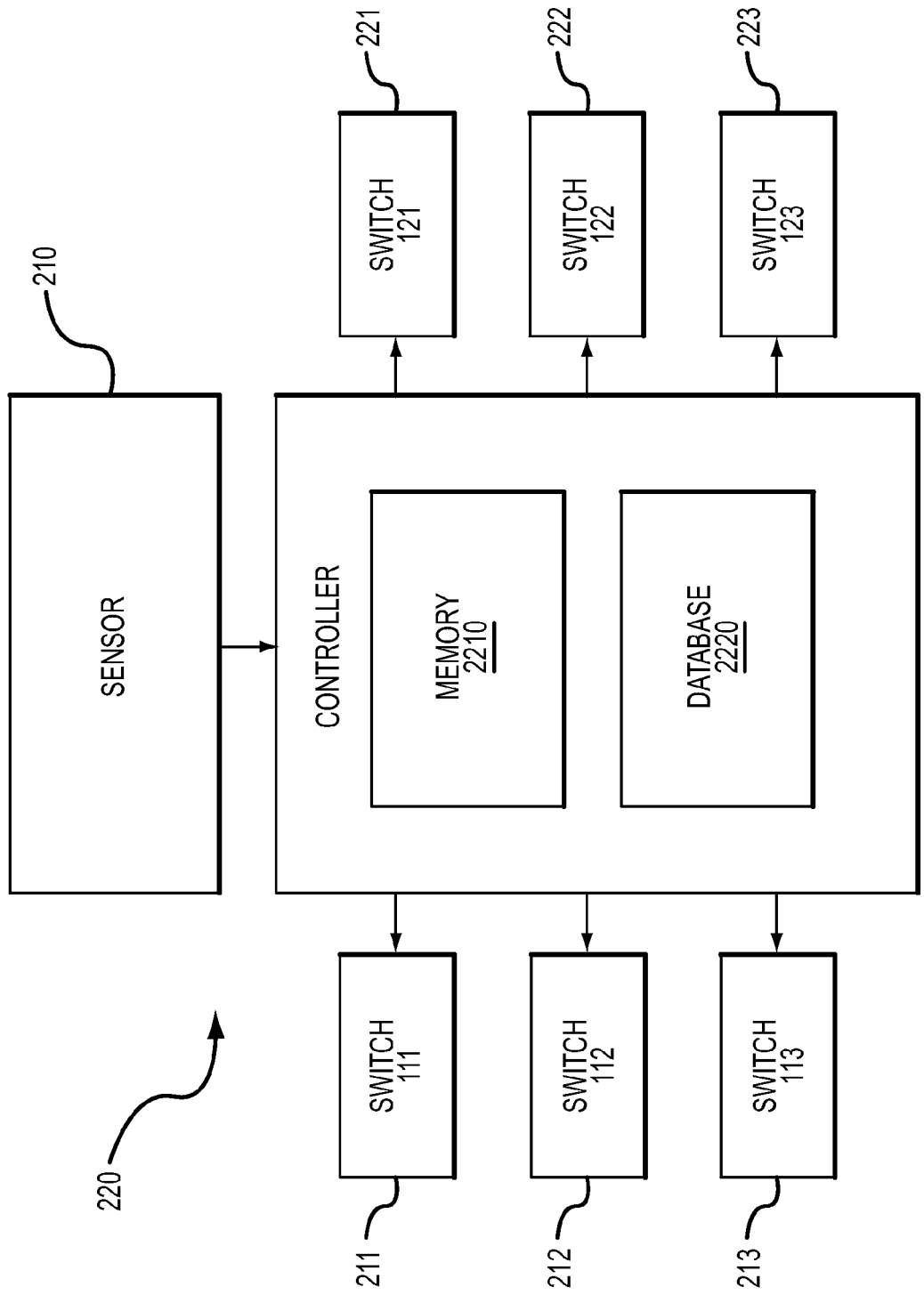
FIG. 3 is a schematic diagram illustrating a more detailed view of the system controller of FIG. 2.

FIG. 3 is a schematic diagram illustrating a more detailed view of system controller 220, which comprises a plurality of switch controllers 211-223 configured to control switches 111-123, respectively. System controller 220 is a control device configured to receive data from sensor 210, process the received data, and transmit control signals to switch controllers 211-223 based on the processed data.

In one embodiment, system controller 220 includes hardware and/or software configured to receive PWM signals from a pulse-width modulator (not shown). The PWM signals include instructions for operating one or more power switches (discussed below) and for producing individual power switch control signals based on the received PWM signals, as is known in the art.

For example and with reference to FIGS. 1-3, system controller 220 is implemented as a processing unit comprising one or more memory devices 2210 (e.g., a programmable read-only memory (PROM), an erasable programmable read-only memory (EPROM), an electrically erasable programmable read-only memory (EEPROM), and the like) storing software to enable system controller 220 to conduct various operations. System controller 220 also comprises a database 2220 (e.g., a look-up table) including a space vector structure (see e.g., Table 1 below) defining a switching space vector associated with the switches within each inverter branch (discussed below) for any given switching combination.

Switch controllers 211-223 are control devices configured to receive control signals from system controller 220 and supply control signals to an associated power switch. In one embodiment, switch controllers 211-223 include hardware and/or software configured to supply power switch control signals to their respective power switch in response to the control signals supplied from system controller 220. That is, switch controller 211 provides power switch control signals to the power switch comprised of switch 111 and diode $D_{11}$. Similarly, the remaining switch controllers each provide a power switch control signals to their respective power switches.

TABLE 1

| Vector | STATUS | Branch 150 | Branch 250 | Branch 350 |
|---|---|---|---|---|
| $V_0$ | Zero | 0 | 0 | 0 |
| $V_1$ | Active | 1 | 0 | 0 |
| $V_2$ | Active | 1 | 1 | 0 |
| $V_3$ | Active | 0 | 1 | 0 |
| $V_4$ | Active | 0 | 1 | 1 |
| $V_5$ | Active | 0 | 0 | 1 |
| $V_6$ | Active | 1 | 0 | 1 |
| $V_7$ | Zero | 1 | 1 | 1 |

Table 1 is representative of database 2220 (e.g., a look-up table) associated with VSI 110 and system controller 220 (see FIGS. 1-3, respectively). The switching space vectors $V_0$-$V_7$ in Table 1 are associated with the power switches within each inverter branch for any given switching combination. Inverter branches 150, 250, and 350 each represent two current bi-directional, voltage uni-directional power switches with one switch within the inverter branch open, while the other switch within the inverter branch is closed. Switching space vectors $V_0$-$V_7$ are created when the three phase-to-neutral voltages sum-up to zero by allowing each of switching space vectors $V_0$-$V_7$ to be associated with a specific inverter switch state.

As illustrated in Table 1, a VSI comprising three inverter branches (each inverter branch including two power switches) provides eight possible switching space vector combinations (i.e., $V_0$-$V_7$). In an example, and with reference to FIGS. 1-3 and Table 1, a "0" represents the upper switch of the indicated inverter branch as being the open switch, while the lower switch within that inverter branch is the closed switch. A "1" represents the lower switch of the indicated inverter branch as being the open switch, while the upper switch within that inverter branch is the closed switch. In this example, switching space vector $V_1$ indicates that inverter branch 150 is configured with switch 111 closed and switch 121 open. Furthermore, inverter branch 250 is configured with switch 122 closed and switch 112 open, and inverter branch 350 is configured with switch 123 closed and switch 113 open.

Table 1 additionally includes a status column indicating either a "zero" state or an "active" state for each switching configuration. An active state indicates that the associated switch configuration results in a net voltage being applied to the load (e.g., AC motor 120). A zero state indicates that the associated switch configuration results in the load being effectively shorted.

Figure 4:
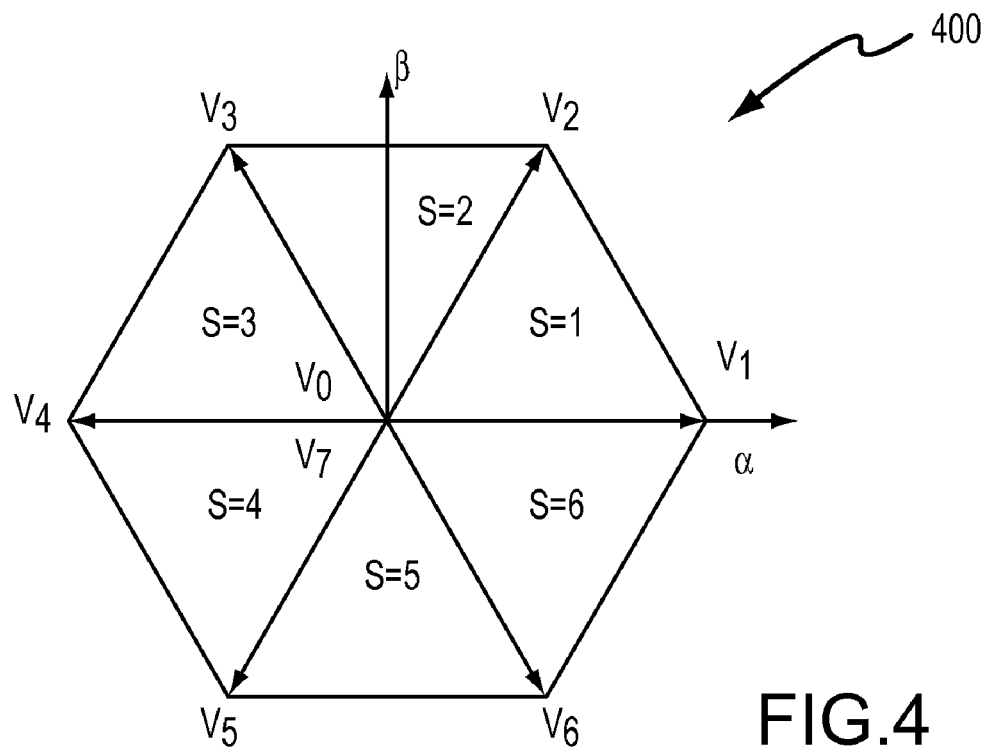
FIG. 4 is an exemplary hexagonal space vector structure diagram illustrating various combinations of inverter switch states of the system controller of FIG. 3.

FIG. 4 is a hexagonal space vector structure diagram 400 illustrating potential combinations of inverter switch states of system controller 220 (see FIG. 2 and Table 1) in accordance with an exemplary embodiment of the invention. In FIG. 4, the active states ($V_1$-$V_6$) from Table 1 are utilized to form the vertices of hexagonal space vector structure diagram 400, and the zero states ($V_0$, $V_7$) are located at the center of hexagonal space vector structure diagram 400. The area lying between the different active states within the hexagon boundaries are labeled as "s=1, s=2, s=3, . . . , s=6" and are referred to as "space vector" areas. Space vector areas are based on one of the switching space vectors $V_0$-$V_7$ that define each respective area.

During use, any voltage requirement falling within the boundaries of hexagonal space vector structure diagram 400 may be produced by a combination of the switching space vectors on a per-cycle basis. Producing the voltage requirement is accomplished by adjusting a combination of one or more active state and/or one or more zero state duty cycles within a period (which is discussed below with reference to FIG. 5). In one example, and with reference to FIG. 4, a voltage requirement falling within space vector area "s=1" may be produced by adjusting a combination of active states $V_1$ and $V_2$ and zero states $V_0$ and $V_7$ of duty cycles within a given period $T_s$ to achieve the required voltage.

Figure 5:
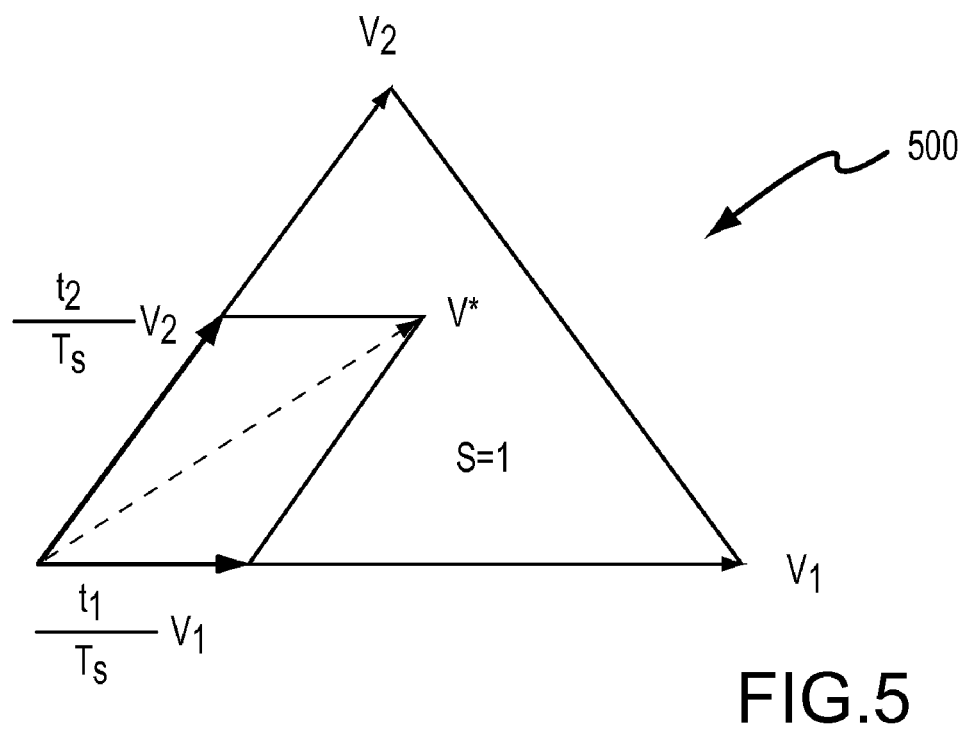
FIG. 5 is an exemplary space vector diagram illustrating a portion of the hexagonal space vector structure diagram of FIG. 4, and representing a desired magnitude and phase of the output voltage.

FIG. 5 is an exemplary space vector area diagram 500 illustrating a portion of hexagonal space vector structure diagram 400 (see FIG. 4) and a reference vector V* that represents a desired magnitude and phase of the output voltage of hexagonal space vector structure diagram 400. In one embodiment (see FIGS. 4 and 5), mapping the reference vector V* to the space vector area diagram 500 enables the space vector area to be determined (e.g., the space vector area s=1 of FIG. 4). In this embodiment, determination of the space vector area allows determination of duty cycles $t_1$-$t_6$ associated with active state switching space vectors $V_1$-$V_6$ (which define the space vector area within a given switching period $T_s$). Once duty cycles $t_1$-$t_6$ for active state switching space vectors $V_1$-$V_6$ are determined, duty cycles $t_0$ and $t_7$ for zero state switching space vectors $V_0$ and $V_7$ may then be determined.

In one example with reference to FIG. 5, the total duty cycle $t_0+t_7$ of zero state switching space vectors $V_0$ and $V_7$ is equal to the duration of the period $T_s$ less the duty cycles $t_1$ and $t_2$ for the switching space vectors $V_1$ and $V_2$. This example may be expressed as the following mathematical equation:

$$d=(t_0+t_7)/T_s=1-[(t_1+t_2)/T_s] \quad (1)$$

In this example, zero state switching space vector $V_0$ and/or $V_7$ may be used during the switching period $T_s$ to achieve the completion of the switching period $T_s$ without affecting the average value of the output voltage delivered to the load. In one embodiment, utilization of zero state switching space vector $V_0$ and/or $V_7$ allows optimization of PWM sequencing to achieve, for example, minimal switching losses, minimal voltage distortion, minimal current distortion, and the like. Furthermore, utilization of the zero state switching space vectors $V_0$ and/or $V_7$ allows distribution of conduction losses among VSI power switches in the inverter branch carrying the largest current.

At low output frequencies the reference vector V* has a small magnitude. In one embodiment, the zero vector duty cycle "$d_z$" for reference vector V* may be mathematically expressed as:

$$d_z >> (t_0+t_7)/T_s >> [(t_1+t_2)/T_s] \quad (2)$$

When PWM is utilized so that the highest phase current is not switched, power dissipation for the power switch carrying the largest amount of current ($I_{max}$), is equal to the maximum conduction power ($P_{cond}$) losses (i.e., ($P_{cond}$) is a function of ($I_{max}$)). The power dissipation may be reduced when conduction loss of the switch carrying the peak current for the duration of the zero vector duty cycle "d" is greater than the amount of energy needed to turn the switch ON and OFF ($E_{sw}$) at the peak current and the switching frequency $f_{sw}$.

In an example, and with continued reference to FIG. 5, zero vector duty cycle "$d_z$" is the duty cycle $d_z$ for zero state switching space vector $V_7$. In this example, the expression may be mathematically expressed as:

$$[P_{cond}(I_{max}) \cdot d_z] > [E_{sw} \cdot f_{sw}] \quad (3)$$

Utilization of either zero state switching space vectors $V_0$ or $V_7$ and/or utilization of a combination of zero state switching space vectors $V_0$ and $V_7$ is referred to as "zero vector modulation" (ZVM). The zero state switching space vectors $V_0$ or $V_7$ are selected periodically at a ZVM frequency $f_{zvm}$ and a zero vector modulation duty cycle $d_{zvm}$ to reduce power dissipation in the switch carrying the largest current. A $f_{zvm}$ of 100 Hz utilizing a ZVM duty cycle $d_{zvm}$ of 0.5 are examples of ZVM implementation.

When ZVM is utilized, average power dissipation for a ZVM period ($T_{zvm}$) for the power switch experiencing the greatest amount of stress may be mathematically expressed as:

$$P_{cond}(I_{max}) - d_{zvm}[P_{cond}(I_{max}) \cdot d_z - E_{sw} \cdot f_{sw}], \quad (4)$$

where ZVM duty cycle $d_{zvm}$ is the complementary zero state duty cycle do for zero state switching space vector $V_0$ for the embodiment in FIG. 5 (i.e., the power dissipation for the switch carrying the largest current is reduced). However, the total losses for the inverter branch carrying the largest current are increased and the increase may be mathematically expressed as:

$$2 \cdot (d_{zvm})(E_{sw}) \cdot (f_{sw}) \quad (5)$$

Based on equations 4 and 5, utilizing a smaller complementary ZVM duty cycle $d_{zvm}$ results in a reduction of power dissipation of the power switch experiencing the greatest amount of stress while producing a relatively small increase in total inverter loss.

In an example with reference to FIG. 5, a ZVM frequency $f_{zvm}$ of 10 Hz utilized with a duty cycle $d_7$ for zero state switching space vector $V_7$ of 0.7, and utilizing a ZVM duty cycle $d_{zvm}$ of 0.65 for zero state switching space vector $V_0$ results in negligible switching losses within a metal oxide semiconductor field-effect transistor (MOSFET) inverter. In this example, ZVM reduces power dissipation within the power switch carrying the largest amount of current, thereby allowing control of the junction temperatures.

Figure 6:
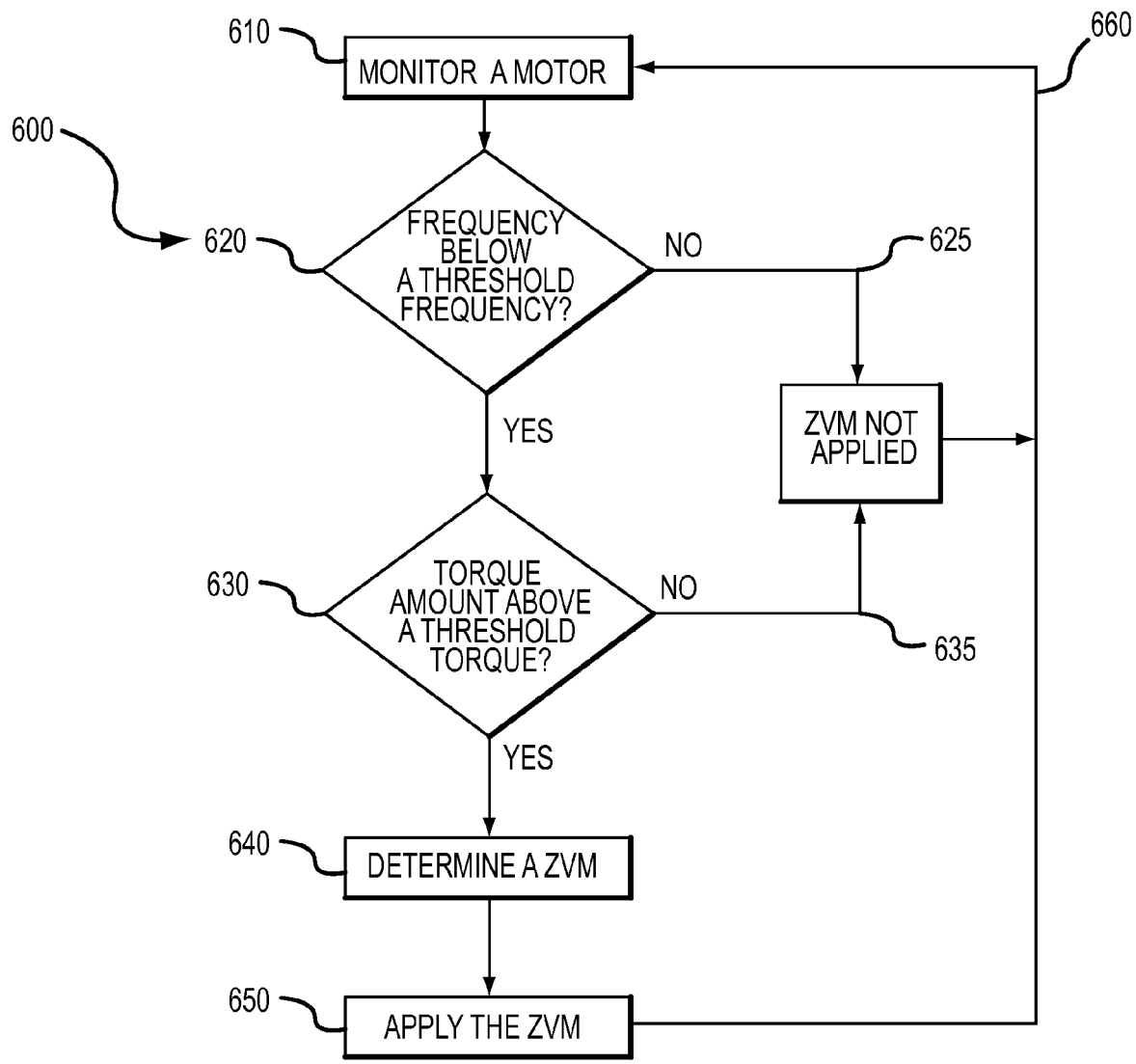
FIG. 6 is a flow diagram of one exemplary embodiment of a method for reducing losses in an inverter when supplying voltage to an electric motor producing a large amount of torque at low output frequencies.

FIG. 6 is a flow diagram illustrating a method 600 for providing improved thermal management in a VSI (e.g., VSI 110) utilizing ZVM according to one exemplary embodiment of the invention. Method 600 begins by monitoring AC motor 120 (step 610).

AC motor 120 is monitored to determine if AC motor 120 is operating at a frequency less than a threshold frequency (step 620). In one embodiment, the threshold frequency is in the range of about 3 Hz to about 5 Hz. Other embodiments contemplate that the threshold frequency may be less than 3 Hz or greater than 5 Hz. If AC motor 120 is operating at a frequency greater than the threshold frequency, a ZVM is not applied to VSI 110 (step 625).

AC motor 120 is also monitored to determine if AC motor 120 is producing an amount of torque greater than a threshold amount of torque (step 630). In one embodiment, the threshold amount of torque is in the range of about 50% to about 70% of the maximum torque AC motor 120 is capable of producing. Other embodiments contemplate that the threshold amount of torque may be less than 50% or greater than 70% of the maximum torque AC motor 120 is capable of producing. If AC motor 120 is producing an amount of torque less than the threshold amount of torque, a ZVM is not applied to VSI 110 (step 635).

If AC motor 120 is operating at a frequency less than the threshold frequency and is producing an amount of torque greater than the threshold amount of torque, a ZVM is determined for VSI 110 (step 640). In one embodiment, a desired output voltage (magnitude and phase), or desired output voltage vector (e.g., a "reference vector") associated with the sensed low output frequency condition is mapped to a space vector area within a space vector structure diagram. In an example with reference to FIGS. 4 and 5, a voltage requirement falling within space vector area "s=1" may be produced by adjusting a combination of the duty cycles for active state switching space vectors $V_1$ and $V_2$ and zero state switching space vectors $V_0$ and $V_7$ within a given period $T_s$ to achieve the required voltage. In this example and with reference to Table 1, each active and zero state switching space vector comprises three associated inverter branch configurations (e.g., inverter branches 150, 250, and 350) defined in Table 1.

The determined ZVM is then applied to VSI 110 to reduce thermal stress of VSI 110 (step 650). In one embodiment, the space vector area including the reference vector is defined by two active state switching space vectors and a zero vector. A combination of the use of active state switching space vectors for a pre-determined time (e.g., the active state duty cycle) within an operating period produces the reference vector. The remaining time (e.g., the operating period less the active state duty cycle) is allocated for the use of a combination of zero state switching space vectors.

In an example with reference to FIG. 5, the duty cycles $t_1$ and $t_2$ for the switching space vectors $V_1$ and $V_2$ are determined based on the reference vector $V^*$. The total duty cycle to $+t_7$ of zero state switching space vectors $V_0$ and $V_7$ is equal to the duration of the period $T_s$ less the duty cycles $t_1$ and $t_2$ for the switching space vectors $V_1$ and $V_2$. In this example, either zero state switching space vectors $V_0$ or $V_7$, or a combination of both zero state switching space vectors $V_0$ and $V_7$ may be used during the switching period $T_s$ to achieve the completion of the switching period $T_s$ without affecting the average value of the output voltage delivered to the load. Power is then delivered to the load (e.g., AC motor 120) based on the duty cycles of the active and zero state switching space vectors that are associated with the specific inverter branch configurations discussed with reference to Table 1.

AC motor 120 is further monitored to determine if a ZVM should be applied to VSI 110 (step 660). AC motor 120 may be further monitored after a ZVM has been applied to determine if the operating frequency and torque conditions remain and the ZVM should continue to be applied, or to determine that the operating frequency and/or torque conditions no longer exist and the ZVM should cease to be applied. Furthermore, AC motor 120 may be further monitored prior to a ZVM being applied to determine if the operating frequency and torque conditions exist so that a ZVM should be applied to VSI 10, or to determine that the operating frequency and/or torque conditions continue not to exist and a ZVM should continue to not be applied.

Figure 7:
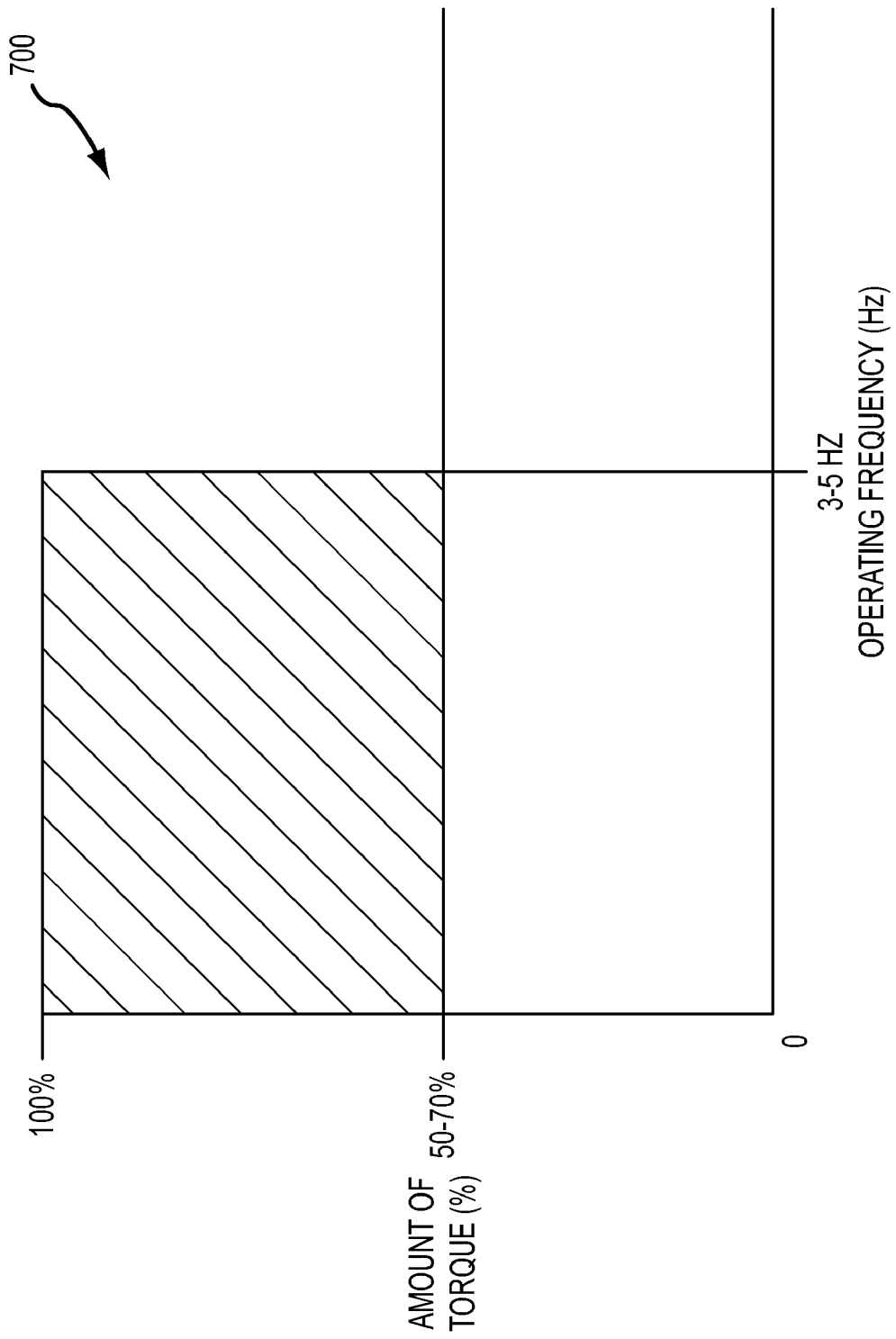
FIG. 7 is a graph illustrating the conditions when a ZVM is applied to the inverter of FIG. 2 in accordance with the various exemplary embodiments of the invention.

FIG. 7 is a graph 700 illustrating the conditions when a ZVM is applied to VSI 110 in accordance with the various exemplary embodiments of the invention. The vertical axis of graph 700 represents the amount of torque (as a percentage) AC motor 120 is capable of producing, and the horizontal axis of graph 700 represents the operating frequencies of AC motor 120.

Graph 700 indicates that a ZVM is applied to VSI 110 when the amount of torque AC motor 120 is producing is greater than a threshold amount of torque (e.g., 50-70% of the torque AC motor 120 is capable of producing) and the operating frequency of AC motor is less than a threshold operating frequency (e.g., 3-5 Hz). Graph 700 also indicates that a ZVM is not applied to VSI 110 when the amount of torque AC motor 120 is producing is less than the threshold amount of torque and/or the operating frequency of AC motor is greater than the threshold operating frequency.

Although specific ranges of threshold torque values and threshold operating frequencies have been discussed, the invention contemplates the use any torque values and/or operating frequencies, whether expressed as a percentage and/or an absolute value. That is, the invention is not limited to the exemplary values discussed above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes may be made in the function and arrangement of elements without departing from the scope of the invention as set forth in the appended claims and the legal equivalents thereof.

What is claimed is:

1. An apparatus for reducing losses in an inverter coupled to a motor, comprising:
 a sensor couplable to the motor and configured to sense an operating frequency and an amount of torque produced by the motor; and
 a controller coupled to the sensor and configured to determine a zero vector modulation (ZVM) for the inverter based on the sensed frequency and torque.

2. The apparatus of claim 1, wherein the controller is configured to apply the determined ZVM to the inverter.

3. The apparatus of claim 2, wherein the controller is configured to apply the determined ZVM to the inverter if the sensed frequency is less than a pre-determined frequency and the sensed torque is greater than a pre-determined amount of torque.

4. The apparatus of claim 3, wherein the controller is configured to cease to apply the determined ZVM to the inverter if the sensed frequency is greater than the pre-determined frequency.

5. The apparatus of claim 3, wherein the controller is configured to cease to apply the determined ZVM to the inverter if the sensed torque is less than the pre-determined amount of torque.

6. The apparatus of claim 1, wherein the motor is an alternating current motor.

7. A system for reducing losses in an inverter coupled to a motor, comprising:
   means for sensing a threshold output frequency of the motor;
   means for sensing a threshold torque of the motor; and
   means for determining a zero vector modulation (ZVM) for the inverter based on the sensed threshold output frequency and threshold torque.

8. The system of claim 7, further comprising means for applying the determined ZVM to the motor.

9. The system of claim 8, further comprising means for ceasing to apply the determined ZVM to the inverter in response to sensing that an output frequency of the motor is greater than the threshold output frequency.

10. The system of claim 8, further comprising means for ceasing to apply the determined ZVM to the inverter in response to sensing that a torque of the motor is less than the threshold torque.

11. The system of claim 8, further comprising means for ceasing to apply the determined ZVM to the inverter in response to sensing that an output frequency of the motor is greater than the threshold output frequency and a torque of the motor is less than the threshold torque.

12. A method for reducing losses in an inverter coupled to a motor, the method comprising the steps of:
   sensing that the motor is operating below a threshold frequency;
   sensing that the motor is producing torque above a threshold torque amount; and
   determining a zero vector modulation (ZVM) for the inverter based on the sensed frequency and torque.

13. The method of claim 12, further comprising the step of applying the determined ZVM to the inverter.

14. The method of claim 13, further comprising the steps of:
   sensing that the motor is operating above the threshold frequency; and
   ceasing to apply the determined ZVM to the inverter in response to the motor operating above the threshold frequency.

15. The method of claim 13, further comprising the steps of:
   sensing that the motor is producing torque below the threshold torque amount; and
   ceasing to apply the determined ZVM to the inverter in response to the motor producing torque below the threshold torque amount.

16. The method of claim 13, further comprising the steps of:
   sensing that the motor is operating above the threshold frequency;
   sensing that the motor is producing torque below the threshold torque amount; and
   ceasing to apply the determined ZVM to the inverter in response to the motor operating above the threshold frequency and producing torque below the threshold torque amount.

17. The method of claim 12, wherein the threshold frequency is in the range of about 3 Hz to about 5 Hz.

18. The method of claim 12, wherein the threshold frequency is about 4 Hz.

19. The method of claim 12, wherein the threshold torque amount is about 50% of a maximum amount of torque of the inverter.

20. The method of claim 12, wherein the threshold torque amount is in the range of about 50% to about 70% of a maximum amount of torque of the inverter.

* * * * *